Feb. 20, 1934. T. W. COSTELLO 1,948,203
ASSEMBLY TOOL
Filed June 28, 1933
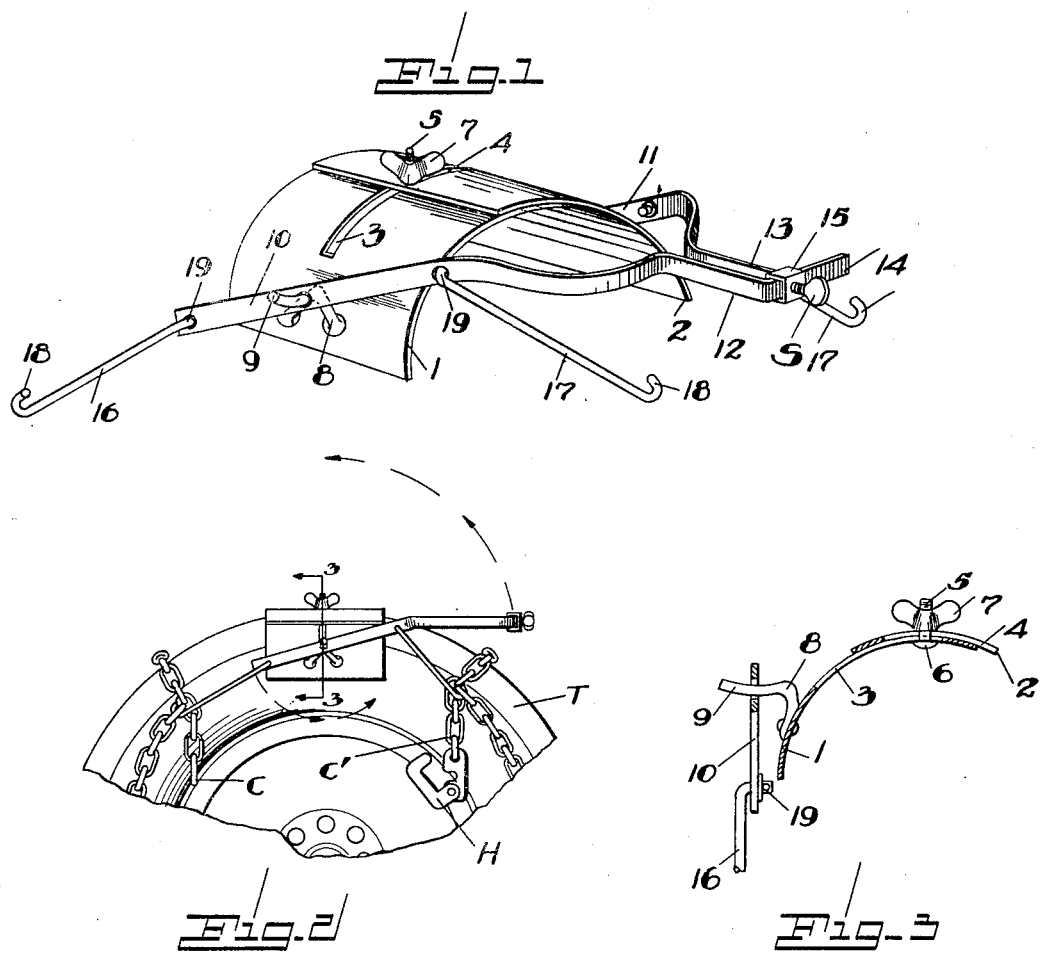
THOMAS W. COSTELLO
*Inventor*
By *Herbert E. Smith*
*Attorney*

Patented Feb. 20, 1934

1,948,203

UNITED STATES PATENT OFFICE 1,948,203

ASSEMBLY TOOL

Thomas W. Costello, Spokane, Wash.

Application June 28, 1933. Serial No. 678,020

4 Claims. (Cl. 254—78)

My present invention relates to an improved assembly tool which, while adapted for various uses, is particularly designed for use in fastening together the ends of detachable, non-skid chains upon tires of wheels of automotive vehicles.

As is well known to motorists, the placing of the non-skid chains upon the tires of automobile wheels is a difficult and tedious job to one who is unaccustomed to such performance, and the primary object of my invention is the provision of an assembly tool which will be of great assistance to the person placing the tire chains in place. By the use of the assembly tool the two ends of the chain may readily and easily be brought together around the wheel or tire and there held in order that the detachable hook at the end of the chain may be properly fastened.

The assembly tool is employed after the wheel has been rolled upon the out-stretched chain, and the two ends of the chain have been brought around the wheel to the upper portion thereof. The tool is provided with a saddle adapted to rest on the top portion of the tire, between the two ends of the chain, and the saddle is equipped with a lever-yoke mounted thereon for connection with the opposite ends of the chain in such manner that the two ends of the chain may be drawn toward each other, after which the usual hook is employed to fasten together the two ends of the chain.

Provision is made for use of the tool on various sizes of tires, and to this end the saddle may be contracted or extended in size to adapt it to the different sizes of tires.

The invention consists in certain novel combinations and arrangements of parts, as will hereinafter be more fully set forth and claimed. In the accompanying drawing I have illustrated one complete example of the physical embodiment of my invention wherein the parts are combined and arranged according to the best mode I have thus far devised for the practical application of the principles of my invention.

Figure 1 is a perspective view of the tool of my invention in position for use.

Figure 2 is a side view of the upper portion of an automobile wheel and its tire, illustrating the manner of pulling together the ends of the tire-chain, according to my invention.

Figure 3 is a vertical, transverse sectional view through a portion of the saddle and the lever-yoke, and showing a portion of a hooked-link.

In order that the general assembly of parts, the utility of the tool, and the relation of parts, may readily be understood I have illustrated in Figure 2 a portion of a tire T, the two ends C and C' of the tire chain to be brought together, and the fastening hook H on one end of the chain which is to be connected with the other end of the chain to hold the chain in place on the tire.

In carrying out my invention I employ a sectional, adjustable, saddle adapted to rest upon, or be supported on the top of the tire between the two ends of the chain after these ends have been brought up from opposite sides of the wheel to positions where they can be drawn together. The saddle comprises two sheet metal plates 1 and 2 of arcuate shape which are adapted to provide a support of approximately semi-circular shape which will rest upon and overhang the sides of the tire.

The saddle may be extended and contracted, transversely to fit over larger or smaller sizes of tires, and for this purpose the plates 1 and 2 are provided respectively with slots 3 and 4 that are alined and extend transversely of the saddle. A clamp bolt 5, having a head 6 is passed through the alined slots, from the inner side of the saddle, and on the exterior end of the bolt a wing-nut 7 is threaded. Thus it will be apparent that the inner overlapping edges of the two sections or plates, when the nut is loosened, may have a sliding engagement, and the two sections may be adjusted to the desired size, and there clamped by use of the nut.

On each plate 3 and 4, a side bracket 8 is riveted, and each bracket is fashioned with a horn or bearing post 9. The bearing posts project laterally from opposite sides of the saddle, and they are slightly curved, as indicated in Figure 3 to assist in holding the lever-yoke which is pivoted on the saddle.

This lever yoke, which is adapted to draw together the two adjoining ends C and C' of the chain, comprises two arms 10 and 11, which are provided with pivot holes to fit over the pivot posts or pins 9 of the saddle, and these arms perform the functions of two-arm levers fulcrumed on the posts or pins. The arms 10 and 11, one at each side of the saddle, extend longitudinally of the saddle, and they are adapted to oscillate on their posts as indicated by the arrows in Figure 2.

Each arm is provided with a handle portion, as 12 and 13, which handle portions are bent inwardly around one end of the saddle, and one of these handles terminates in an angular bar 14 extending transversely of the saddle, while the other handle terminates in a loop or eye 15, through which the bar 14 extends, and the latter is guided by the former when the saddle is being adjusted. A set screw or bolt S is threaded in the loop 15 and is adapted to impinge against the bar 14 within the loop and hold the two parts of the lever-yoke together.

Each arm 10 and 11 is provided with a pair of links as 16 and 17 that are formed with hooks 18 at their free ends, and pivoted at 19 on the respective arms. The two links 16 at opposite sides of the saddle and the two links 17 at opposite sides of the saddle, project in opposite directions in order that the hooks 18 on the links may be engaged with links of the two ends of the chain, as C and C', as indicated in Figure 2.

With the parts in the positions indicated in Figure 2, it will be apparent that as the handle of the yoke is turned upwardly in the direction of the arrows, the lever-yoke will swing on its fulcrums 9, 9, and the arms 10 and 11 will swing anti-clockwise in the direction of the arrows in Figure 2. Thus the pivot ends of links 16 are swung downwardly to the right and the pivot ends of links 17 swing upwardly to the left, thereby drawing the two ends of the chain toward the saddle. When the ends C and C' have been brought sufficiently close together to be joined by the hooks H (one at each side of the tire) these hooks are engaged with suitable links of the tire-chain to hold the latter in position on the tire.

After the ends of the chain have been joined, the links 16 and 17 are disconnected from the chain, and then the saddle is removed from the tire, and is ready for use again when required.

Having thus fully described my invention, what I claim as new and desire to secure by Letters Patent is:—

1. An assembly tool comprising a saddle adapted to rest upon a tire, a lever-yoke pivotally supported on the saddle, and a pair of hooked-links pivotally mounted on the yoke at opposite sides of its fulcrum.

2. An assembly tool comprising a sectional, adjustable, saddle and fastening means therefor, a sectional, adjustable lever-yoke mounted on the saddle and means for holding the lever-yoke sections in adjusted position, and a pair of hooked links pivotally mounted on the yoke at opposite sides of its fulcrum.

3. An assembly tool comprising a pair of curved, slotted plates forming a saddle, and a clamp bolt for said plates, a lever-yoke comprising a pair of adjustable sections and fastening means therefor, said yoke fulcrumed at opposite sides of the saddle, and a pair of hooked-links pivotally mounted on the yoke at opposite sides of said fulcrums.

4. The combination with a saddle shaped to conform to the periphery of a wheel-tire and a pair of laterally disposed pivot-posts on said saddle, of a lever-yoke fulcrumed on said posts, and a pair of hooked-links pivotally mounted on the yoke at opposite sides of the fulcrums.

THOMAS W. COSTELLO.